(12) United States Patent
King

(10) Patent No.: US 11,486,552 B2
(45) Date of Patent: Nov. 1, 2022

(54) ILLUMINATION

(71) Applicant: BDZ Investments Ltd, Newbury (GB)

(72) Inventor: John Bernard King, Newbury (GB)

(73) Assignee: BDZ INVESTMENTS LTD, Newbury (GB)

( * ) Notice: Subject to any disclaimer, the term of this patent is extended or adjusted under 35 U.S.C. 154(b) by 0 days.

(21) Appl. No.: 17/265,033

(22) PCT Filed: Aug. 2, 2019

(86) PCT No.: PCT/GB2019/000109
§ 371 (c)(1),
(2) Date: Feb. 1, 2021

(87) PCT Pub. No.: WO2020/025916
PCT Pub. Date: Feb. 6, 2020

(65) Prior Publication Data
US 2021/0310622 A1      Oct. 7, 2021

(30) Foreign Application Priority Data

Aug. 2, 2018   (GB) ...................................... 1812623

(51) Int. Cl.
| | |
|---|---|
| *F21L 17/00* | (2006.01) |
| *B60Q 7/00* | (2006.01) |
| *F21L 4/00* | (2006.01) |
| *B65D 83/00* | (2006.01) |
| *F21W 111/00* | (2006.01) |

(52) U.S. Cl.
CPC ................ *F21L 17/00* (2013.01); *B60Q 7/00* (2013.01); *B65D 83/00* (2013.01); *F21L 4/00* (2013.01); *F21W 2111/00* (2013.01)

(58) Field of Classification Search
CPC ... F21L 17/00; F21L 4/00; B60Q 7/00; B65D 83/00
See application file for complete search history.

(56) References Cited

U.S. PATENT DOCUMENTS

| | | | | |
|---|---|---|---|---|
| 4,827,245 A | * | 5/1989 | Lipman .................... | B60Q 7/02 340/478 |
| 7,106,179 B1 | * | 9/2006 | Dueker .................... | B60Q 1/52 362/153.1 |

(Continued)

FOREIGN PATENT DOCUMENTS

| | | | | |
|---|---|---|---|---|
| WO | WO-9838454 A1 | * | 9/1998 | ............... F21K 2/06 |

*Primary Examiner* — Leah Simone Macchiarolo
(74) *Attorney, Agent, or Firm* — McClure, Qualey & Rodack, LLP

(57) ABSTRACT

A method is described for deploying one or more illumination devices. The or each illumination device is self-contained and has a first state in which it is inoperative and a second state in which it is operative to provide illumination at at least one frequency within the range from and including infrared to and including ultraviolet. The method comprises the steps, optionally repeated at intervals, of: actuating a mechanism to move a said illumination device from a housing storing one or more illumination devices to an exposed position outside the housing; and automatically changing the state of the illumination device from its first state to its second state as a direct result of movement of the illumination device from within the housing to the exposed position.

20 Claims, 6 Drawing Sheets

(56) References Cited

U.S. PATENT DOCUMENTS

| | | | |
|---|---|---|---|
| 8,348,464 B2* | 1/2013 | McDermott | B60Q 7/00 |
| | | | 362/276 |
| 10,180,244 B2* | 1/2019 | Stamatatos | B60Q 1/2615 |
| 2012/0287611 A1* | 11/2012 | Wilson | F21L 4/08 |
| | | | 362/183 |
| 2014/0126187 A1* | 5/2014 | Bennett | F21L 2/00 |
| | | | 362/183 |

* cited by examiner

ILLUMINATION

FIELD OF THE DISCLOSURE

This disclosure relates to deployment of one or more illumination devices.

BACKGROUND

Illumination systems for indoor or outdoor use are very well known. Conventional arrangements involve a number of illumination devices, typically electric lights, coupled by electric wiring to a power source, typically mains electric power; and the resultant installations are intended to be at least semi-permanent. The system may be designed to provide illumination per se, as in domestic lighting, or to provide an indication to others, as in the case of beacons marking an aircraft runway.

The present disclosure adopts a fundamentally different approach to the provision of illumination. As will become clear from the description below, illumination apparatus adopting the teachings of the present disclosure is particularly suitable where an external power supply such as mains electricity may not be available or when the installation is intended to be temporary.

Previous attempts to provide temporary illumination have generally been hampered by the portable equipment being bulky and heavy to transport, and by the limitations of the lengths of electric cabling connecting individual illumination devices to an external power source. Chemiluminescent devices which do not require an external power source have also been used for short term temporary illumination. Heretofore, such devices have needed to be individually armed by a user before or during deployment, resulting in time-consuming deployment.

SUMMARY OF THE DISCLOSURE

According to a first aspect of this disclosure, we provide a method of deployment of one or more illumination devices, the or each illumination device being self-contained and having a first state in which it is inoperative and a second state in which it is operative to provide illumination at at least one frequency within the range from and including infrared to and including ultraviolet, the method comprising the steps, optionally repeated at intervals, of: actuating a mechanism to move a said illumination device from a housing storing one or more said illumination devices to an exposed position outside the housing; and automatically changing the state of the said illumination device from its first state to its second state as a direct result of said movement from within the housing to said exposed position.

In accordance with a second and alternative aspect of this disclosure, there is provided an illumination device deployment apparatus comprising: a housing; at least one self-contained illumination device stored within the housing, the illumination device having a first state in which it is inoperative and a second state in which it is operative to provide illumination at at least one frequency within the range from and including infrared to and including ultraviolet, the device being in said first state when within the housing; a moving mechanism adapted to move a said illumination device from within said housing to an exposed position outside the housing requiring illumination; and an arming device associated with the moving mechanism effective to change the state of the illumination device from its first to its second state as a consequence of movement of said illumination device from within the housing to the said exposed position.

In a third alternative aspect of this disclosure, a method is provided for marking a line or laying a trail, the method comprising deploying at intervals, while following the line or trail, which intervals need not be the same, individual self-contained illumination devices from a housing therefor, and automatically arming each such device as it is deployed to provide illumination at at least one frequency within the range from and including infrared to and including ultraviolet.

The term "self-contained" is used throughout this disclosure to refer to illumination devices that incorporate their own power supply and so require no external wiring, or, as in the case of a chemiluminescent device, do not require any power supply.

Preferred embodiments include one or more of the following features: A plurality of essentially identical illumination devices are mounted within a cartridge loaded into said housing, the cartridge being capable of replacement by a fresh cartridge with a further plurality of essentially identical illumination devices mounted therewithin or capable of replenishment with further essentially identical illumination devices. Each illumination device includes its own battery electric supply, and the arming device completes an electric circuit within the device. Alternatively, each illumination device comprises a chemiluminescent device and the arming device removes a barrier between chemical reagents within the device, which reagents when mixed produce light.

BRIEF DESCRIPTION OF THE DRAWINGS

Reference may be made to the accompanying drawings, which illustrate particular embodiments by way of example only, and in which.

DESCRIPTION OF PREFERRED EMBODIMENTS

Figure 1:
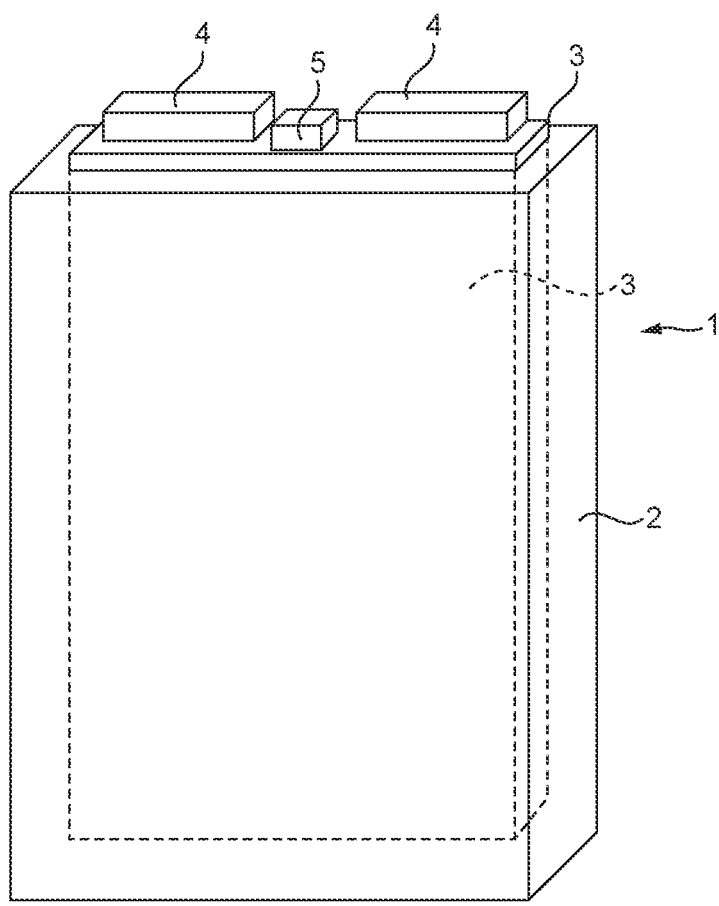
FIG. 1 is a perspective view of a first embodiment of illumination device.

Turning first to FIG. 1, the illustrated illumination device 1 comprises an outer casing 2, within which a printed circuit board (hereafter: PCB) 3 is located, the PCB 3 being provided with a pair of activation contacts 4 and a deactivation contact 5 protruding from one end of the casing 2. Within the casing 2, but not illustrated, is a light source. The light source is suitably one or more light emitting diodes (hereafter: LEDs) or electroluminescent material and is connected in an electric circuit passing through the PCB 3 and including a battery power source within casing 2. Making an electric connection between the two activation contacts activates a switch within the PCB 3 to complete the said electric circuit to power the one or more LEDs. Space within the casing not occupied by the PCB may be filled with glass beads or other refractive materials to spread, concentrate or direct the light output, and the open end of casing 2 adjacent the contacts may be sealed with resin to prevent ingress of moisture. At least an outer wall of the casing may be formed of metal, typically of steel or of aluminium, in which case, the metal casing wall should be pierced by apertures to allow light from the LEDs to shine therethrough. In an alternative arrangement, apart from the portion of the PCB 3 protruding from one end of casing 2, as illustrated in FIG. 1, the casing may encapsulate the PCB as well as the one or more LEDs. To this end the casing may be formed of any clear, translucent or coloured mouldable material such as polyvinyl chloride (hereafter: PVC), polyurethane, resin or glass capable of encapsulating the PCB and one or more LEDs without destroying them.

Although casing 3 is depicted in FIG. 1 as a rectangular cuboid, this is not necessary. The casing may take any suitable geometry provided that the PCB can be encapsulated and light from the LEDs may be transmitted through the casing.

Figure 2:
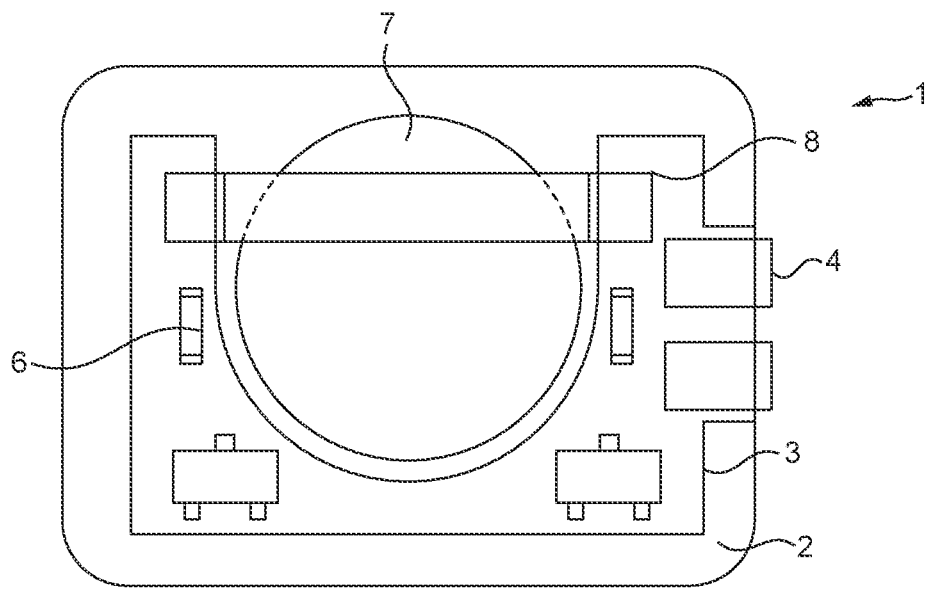
FIG. 2 is a front elevational view of a second embodiment of illumination device.
Figure 3:
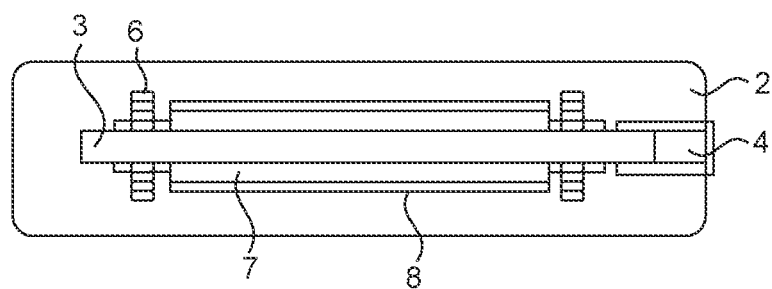
FIG. 3 is a side elevational view of the illumination device of FIG. 2.

FIGS. 2 and 3 show the internal structure of an alternative embodiment of illumination device. Like reference numerals are employed for like parts to those of the FIG. 1 embodiment. Casing 2 is here transparent so that the PCB 3 and LEDs 6, here four in number, can be seen through the casing. Two LEDs are mounted on each side of the illumination device to shine through the encapsulating casing 2, so that it matters not which way up the device sits. A battery, here a so-called watch battery or button cell battery 7, preferably a lithium-metal battery, is held in place by battery clips 8 on both sides of PCB 3. A pair of edge contacts 4 with copper foil rolled over the end extend proud of the encapsulating casing and serve as the activation contacts for the illumination device. The illumination device illustrated in FIGS. 2 and 3 can be manufactured to be relatively small, typically with dimensions of 20 mm×15 mm×5 mm, since the combination of the relatively high charge density provided by a lithium-metal button cell combined with the relatively low power requirements of LEDs, provides a useful life for the device while still providing a useful luminous intensity.

A plurality of illumination devices are preferably mounted in a cartridge which in turn is mounted within a housing, preferably a hand-held housing, from which the devices may be deployed, the housing being openable to exchange cartridges or to replenish the one cartridge.

Figure 4:
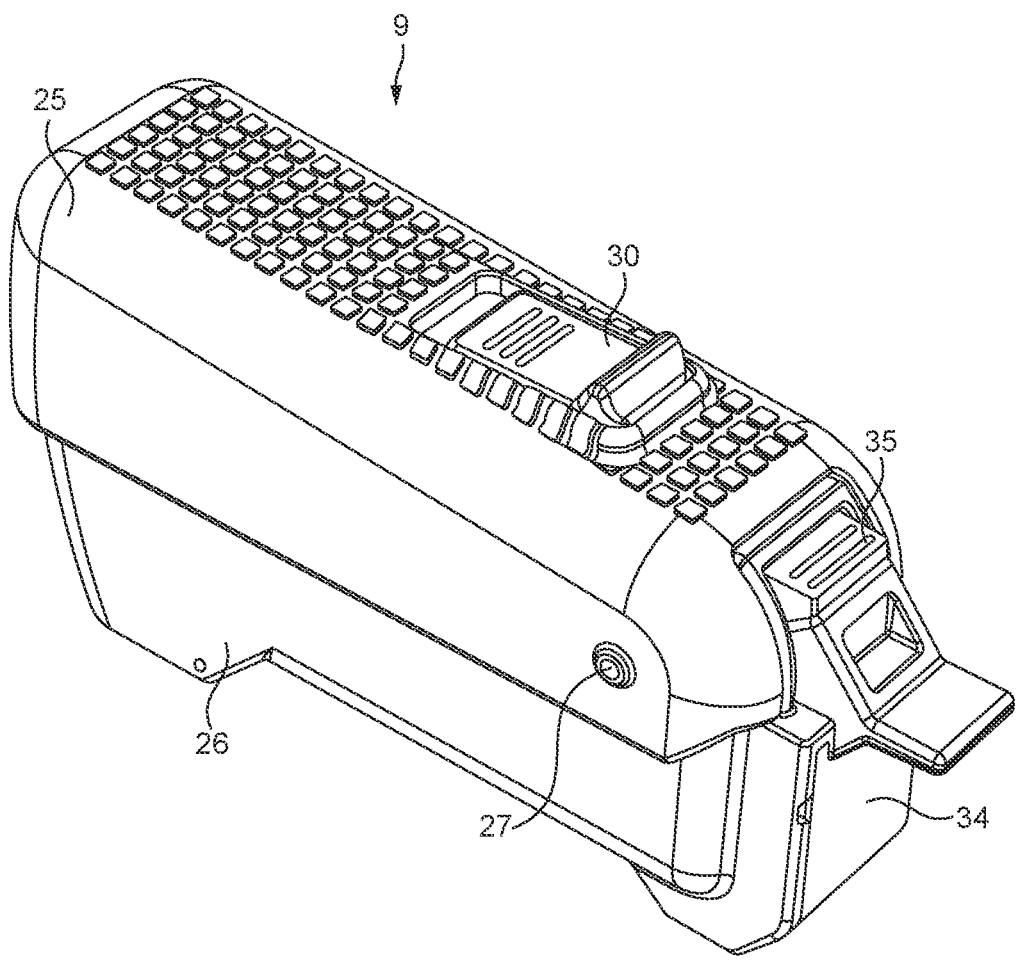
FIG. 4 is a perspective view of an illumination device deployment apparatus.
Figure 5:
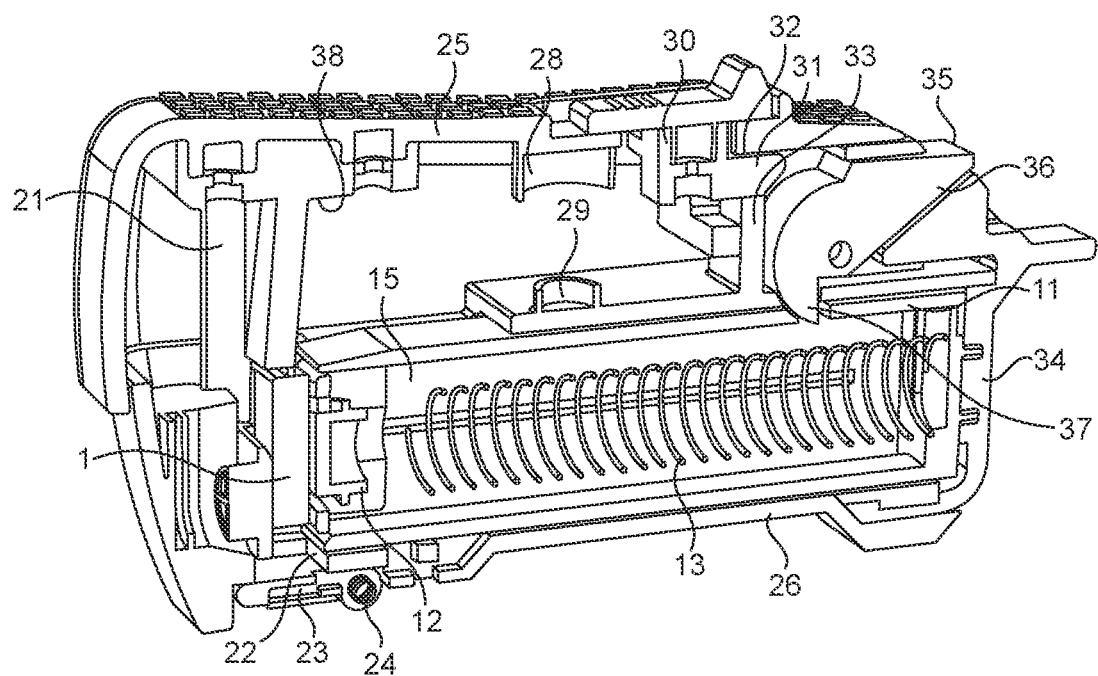
FIG. 5 is a perspective view of the illumination device deployment apparatus of FIG. 4 with parts broken away to show internal structure.
Figure 6:
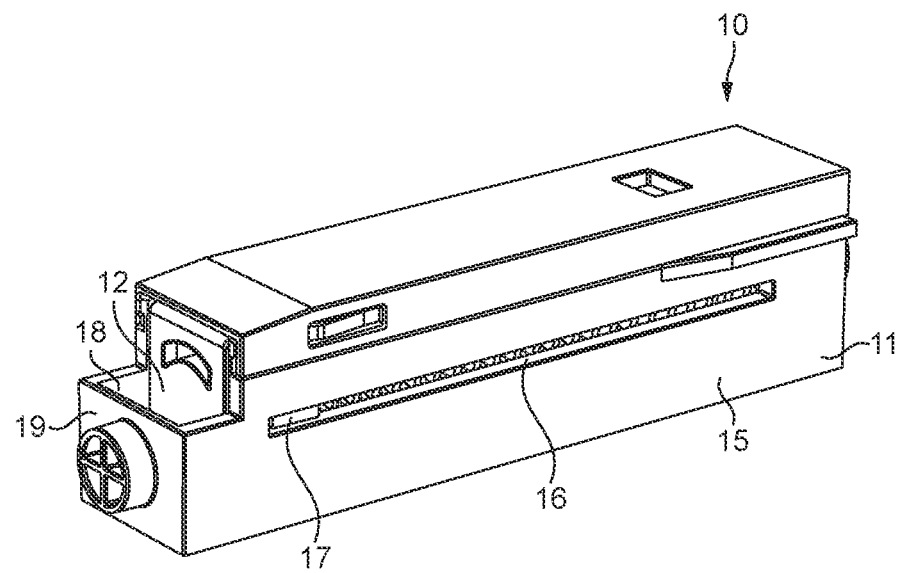
FIG. 6 is a perspective view of a cartridge for illumination devices for the apparatus of FIGS. 4 and 5.
Figure 7:
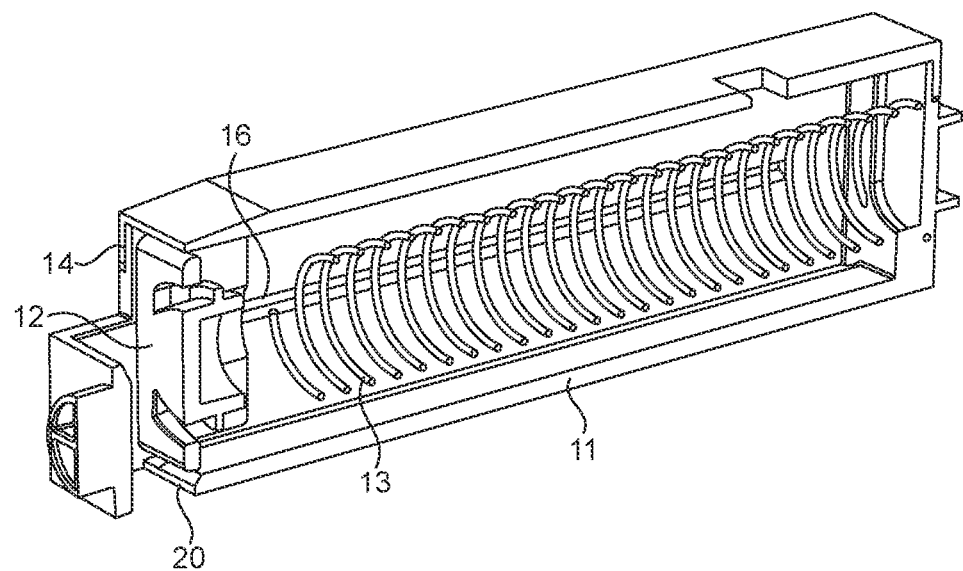
FIG. 7 is a perspective view of the cartridge of FIG. 6 on a smaller scale and partly broken away to show internal structure.

FIGS. 4 and 5 show an exemplary hand-held housing 9 and FIGS. 6 and 7 illustrate an exemplary cartridge 10, but other arrangements will readily occur to a skilled person.

Figure 8:
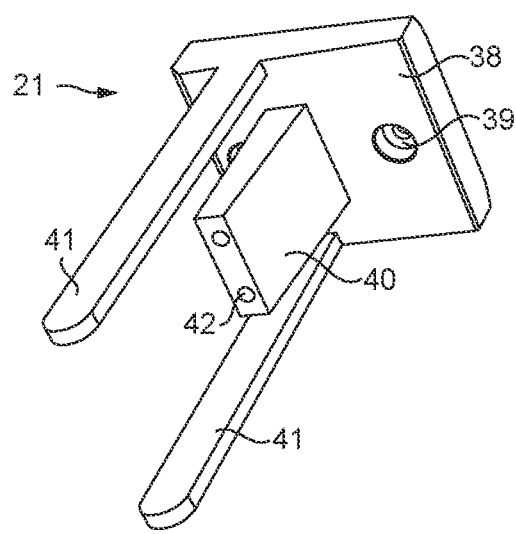
FIG. 8 is an enlarged view of an ejector pin for the apparatus of FIGS. 4 and 5.

Cartridge 10 comprises a cartridge casing 11 within which a plurality of illumination devices 1 are mounted and urged by a plate 12 biased by a compression spring 13 to the left in FIGS. 5, 6 and 7 towards cartridge exit 14. Side walls 15 of cartridge 9 have a longitudinally extending through slot 16, and respective abutments 17 on opposite sides of spring plate 12 are located in, slide along and are guided by the slots. Slots 16 also allow a user to engage the spring plate by its abutments 17 and push it to the right in the orientation of FIGS. 6 and 7 while replenishing the cartridge 10 with a fresh supply of illumination devices 1. Cartridge exit 14 provides a through passage 18 with a width corresponding to that of an illumination device and an end wall 19. As best shown in FIG. 5, the leftmost illumination device 1 is urged by the spring loaded plate 12 into the exit passage 18 where it is held against end wall 19 by the force of the compression spring 13 above opening 20 in through passage 18, where it is ready to be ejected from housing 9 by an ejector pin 21 (FIG. 8). Housing 9 has an opening 22 corresponding in position to opening 20 and closed by a flap 23 biased to close opening 22 by a torsion spring 24.

Housing 9 is formed from two main housing components 25 and 26 pivotally coupled by pivot pins 27, and ejector pin 21 is mounted on the inner underside of housing component 25. Squeezing the two housing components together by hand at their leftwards ends in the orientation of FIGS. 4 and 5 to pivot about pivot pins 27 causes ejector pin 21 to engage with illumination device 1 present in exit through passage 18 to push it past spring loaded flap 23 and out of the housing 8. A return compression spring (omitted from FIG. 5 for clarity) has one end located within cylindrical boss 28 on the underside of housing component 25 and its other end located outside cylindrical boss 29 on an internal surface of housing component 26, and serves to return housing components 25 and 26 to their original positions after being squeezed together to deploy an illumination device.

However, in order that the left ends of components 25 and 26 can be squeezed together, a slide member 30 must first be pushed forwardly to the left in FIGS. 4 and 5 to release a portion 31 thereof from a passage 32 between the underside of housing component 25 and an upstanding abutment 33 on housing component 26. It will be appreciated that housing component 26 is essentially hollow to accommodate cartridge casing 11, with an open end closed by cartridge plug 34. Access to cartridge 10 is achieved by removing cartridge plug 34 and depressing one end 35 of a pivotable release lever 36 with a catch 37 at its other end. Cartridge 10 can then be slid out of the open end of the housing 9 for replacement with a fresh cartridge or replenishment with fresh illuminating devices.

Referring to FIG. 8, it will be seen that ejector pin 21 comprises a base 38, with openings 39 allowing it to be mounted to the internal surface of housing component 25, which base has a central projection 40 and two side projections 41 projecting therefrom. Central projection 40 includes metal contacts 42 positioned to engage activation contacts 4 on the illumination device 1 to complete the aforementioned electric circuit to its LEDs. At the same time, side projections 41 of ejection pin 21 extend on either side of the illumination device to engage and open flap 23, enabling the now armed illumination device to be deployed through openings 20 and 22 out of housing 8.

As described hereinabove, the illumination device is armed by a purely mechanical device that completes a circuit between activation contacts on the illumination device to switch on a circuit between the internal battery and one or more LEDs in the illumination device. Alternative arming devices will readily occur to persons skilled in this field in the light of the present teachings, and include an ultraviolet light beam switch, reed switches, pressure switches, the use of visible light and a photo resistor switch, an infrared sensor or a Hall effect magnet sensor.

The illumination device preferably also includes a deactivation system so that it can be turned off after activation. In the embodiment of FIG. 1 this is provided by deactivation contact 5. Making an electric connection between contact 5 and either of the activation contacts 4 switches off the internal circuit connecting the battery with the LEDs. Other forms of deactivation may be employed such as a simple pressure switch.

Other forms of illuminating device are also contemplated and can be deployed by a housing similar to housing 9 utilising a cartridge similar to cartridge 10. In particular, illumination may be provided by chemical rather than electrical means, and specifically by chemiluminescence. In this form of device, arming as the device is deployed may be achieved by breaking a partition separating two chemical reagents which produce light from a chemical reaction between them. The variety of illuminating systems that can be employed in an illumination device in accordance with the teachings of the present disclosure mean that a broad range of devices can be manufactured to meet the needs of customers, with differing light intensities and differing time periods, up to as long as 120 hours, during which they remain operable.

Although cartridge 10 with a supply of illumination devices 1 is mounted in a housing 9 designed to be hand-held in the arrangement illustrated in FIGS. 4 et seq., and illumination devices are deployed by hand from the housing, in this case by squeezing the housing components together, this is not necessary, and other arrangements are contemplated. Thus, a similar cartridge 10 may be mounted in a compartment in or mounted on a vehicle and serving effectively as a housing, and deployment of individual illumination devices from the vehicle may be triggered mechanically or electrically at fixed intervals or at times decided by an operator.

We contemplate that illumination devices may simply be dropped on to the ground, or may include an adhesive pad on a rear surface or exposed by removing a cover to allow the device to be stuck to a surface such as a wall or a tree.

Illumination devices as described herein are particularly useful for search and/or rescue organisations or for use by the military, but they may be used for a variety of different marking or illumination purposes, including, but not limited to illuminating a walkway, a garden or particular features within a garden; use as a directional aid; marking a trail for rescuers in an underground cave system or smoke-filled building; marking a temporary runway, helicopter pad, or drop-zone; or marking a hazard to be avoided such as a minefield or an improvised explosive device; or a safe route through a minefield. Because the illumination need not be in the visible spectrum, the devices can also serve a covert purpose, for example by only being visible to personnel with appropriate night-vision or ultra-violet sights.

The invention claimed is:

1. A method for deploying self-contained illumination devices, each having a first pre-operative state in which it is inoperative but ready for use and a second state in which it is operative to provide illumination at at least one frequency within the range from and including infrared to and including ultraviolet, the method comprising the steps, optionally repeated at intervals, of: actuating a mechanism to move a said illumination device from a chamber common to all said devices and located within a housing storing said illumination devices in said first state towards and through a common passage from the housing to an exposed position outside the housing; and automatically changing the state of the said illumination device from its first state to its second state as a direct result of and in the course of movement through said common passage.

2. A method according to claim 1, wherein a plurality of essentially identical illumination devices are mounted within a cartridge loaded into said housing, the method including the step of replacing a spent cartridge with no remaining illumination devices by a fresh cartridge with a further plurality of essentially identical said illumination devices mounted therewithin.

3. A method according to claim 1, wherein a plurality of essentially identical said illumination devices are mounted within a cartridge loaded into said housing, the method including the step of replenishing the cartridge with further essentially identical said illumination devices.

4. A method according to claim 1, wherein each illumination device includes its own battery electric supply, and the step of automatically changing the state of the illumination device comprises arming the device by completing an electric circuit within the device.

5. A method according to claim 1, wherein each illumination device comprises a single-use chemiluminescent device and the step of automatically changing the state of the illumination device comprises arming the device by removing a barrier between chemical reagents within the device, which reagents when mixed produce light.

6. A method according claim 1, wherein the passage has an opening through which the illumination device is forcibly ejected from the housing and adapted freely to drop to the ground, the illumination device being adapted to emit light regardless of the orientation in which it lies on the ground and to do so for a predetermined period after its change of state to its second state.

7. An illumination device deployment apparatus comprising: a housing; a plurality of self-contained illumination devices stored in a common chamber within the housing, each said illumination device having a first pre-operative state in which it is inoperative but ready for use and a second state in which it is operative to provide illumination at at least one frequency within the range from and including infrared to and including ultraviolet, the device being in said first state when within said common chamber; a mechanism adapted upon actuation to move a said illumination device from within said common chamber towards and through a common passage from the housing to an exposed position outside the housing which requires illumination; and an arming device associated with the said mechanism effective to change the state of the illumination device from its first to its second state as a direct result of an in the course of movement of said illumination device through said common passage from within the housing to the said exposed position.

8. Apparatus according to claim 7, wherein a plurality of essentially identical illumination devices are mounted within a cartridge loaded into said housing, the cartridge being capable of replenishment by a fresh cartridge with a further plurality of essentially identical illumination devices or being capable of being refilled with further essentially identical illumination devices.

9. Apparatus according to claim 8, wherein each of the plurality of essentially identical illumination devices includes its own battery electric supply, and the arming device completes an electric circuit within the device.

10. Apparatus according to claim 8, wherein each of the plurality of essentially identical illumination devices comprises a single-use chemiluminescent device, and the arming device removes a barrier between chemical reagents within the device, which reagents when mixed produce light.

11. Apparatus according to claim 8, wherein each of the plurality of essentially identical illumination devices comprises a metal casing, preferably of steel or aluminium, and having at least one aperture allowing light to shine through said at least one aperture.

12. Apparatus according to claim 8, wherein each of the plurality of essentially identical illumination devices comprises an encapsulating casing formed of a mouldable material selected from the group consisting of polyvinyl chloride, polyurethane, resin and glass.

13. Apparatus according to claim 7, wherein the illumination device includes its own battery electric supply, and the arming device completes an electric circuit within the device.

14. Apparatus according to claim 7, wherein the illumination device comprises a single-use chemiluminescent device, and the arming device removes a barrier between chemical reagents within the device, which reagents when mixed produce light.

15. Apparatus according to claim 7, wherein the illumination device comprises a metal casing, preferably of steel or aluminium, and having at least one aperture allowing light to shine through said at least one aperture.

16. Apparatus according to claim 7, wherein the illumination device comprises an encapsulating casing formed of a mouldable material selected from the group consisting of polyvinyl chloride, polyurethane, resin and glass.

17. Apparatus according to claim 7, wherein the housing has an opening through which the illumination device is forcibly ejected from the housing and adapted freely to drop to the ground, the illumination device being adapted to emit light regardless of the orientation in which it lies on the ground and to do so for a predetermined period after its change of state to its second state.

18. A method for marking a line or laying a trail, the method comprising deploying at intervals, while following the line or trail, which intervals need not be the same, individual self-contained illumination devices from a common chamber therefor within a housing by movement towards and through a common passage from the housing to the exterior thereof, and automatically arming each such device as a direct result of and in the course of movement through the common passage to provide illumination at at least one frequency within the range from and including infrared to and including ultraviolet.

19. A method according to claim 18, wherein the housing consists of a vehicle provided with an opening from the passage through which said illumination devices are adapted to be ejected from the vehicle.

20. A method according to claim 18, wherein the housing is hand-held, and comprises an opening from the passage for ejection of said illumination devices from the housing, the housing comprising two housing components adapted to be squeezed together with the housing held in one hand to thereby deploy a said illumination device by ejecting it through the said opening.

* * * * *